United States Patent [19]
DeLorean et al.

[11] Patent Number: 6,142,320
[45] Date of Patent: Nov. 7, 2000

[54] METHOD OF STORING ELONGATED IMPLEMENTS BETWEEN CORNER SIDE WALLS, A HOLDING MEMBER, AND A FLOOR

[75] Inventors: Jack Z. DeLorean, 2779 Amberly Rd., Bloomfield Village, Mich. 48301; Paul J. DeLorean, Bloomfield Village, Mich.

[73] Assignee: Jack Z. DeLorean, Bloomfield Village, Mich.

[21] Appl. No.: 08/958,359

[22] Filed: Oct. 27, 1997

Related U.S. Application Data

[63] Continuation-in-part of application No. 08/670,977, Jun. 26, 1999, abandoned.

[51] Int. Cl.[7] .................................. A47F 7/00; E04G 3/08
[52] U.S. Cl. .................. 211/70.6; 211/105.3; 211/105.1; 248/220.1
[58] Field of Search .............................. 211/70.6, 87.01, 211/105.3, 105.4, 105.1, 65; 248/298.1, 220.1

[56] References Cited

U.S. PATENT DOCUMENTS

| | | | |
|---|---|---|---|
| 814,811 | 3/1906 | Speed | 248/216.1 |
| 822,133 | 5/1906 | Kennedy | 211/104 |
| 1,159,813 | 11/1915 | Volkhardt | 211/104 |
| 1,286,588 | 12/1918 | Goodykoontz | 108/28 |
| 1,325,143 | 12/1919 | Conterio | 108/42 |
| 4,555,082 | 11/1985 | Sack et al. | 248/220.1 |
| 4,664,266 | 5/1987 | Fausett et al. | 211/87.01 |
| 5,042,766 | 8/1991 | Baker | 248/200.1 |
| 5,154,384 | 10/1992 | Owens | 248/220.1 |
| 5,743,416 | 4/1998 | Yemini | 211/70.6 |

*Primary Examiner*—Daniel P. Stodola
*Assistant Examiner*—Gregory J. Strimbu
*Attorney, Agent, or Firm*—David Pressman

[57] ABSTRACT

In a room or building having adjoining side walls forming a corner and a floor forming with the side walls an open pocket adjacent the floor, a storage system having a cross member for retaining elongated implements such as garden tools and skis bearing on the floor and in a generally vertical position between the side walls and leaning outwardly from the corner toward the cross member. The length of the cross member is adjustable, to a selected length extending between the side walls. The cross member includes mounting pieces disposed at distal ends of the cross member to secure the cross member to the walls. The cross member extends between the two side walls above the floor and the mounting pieces attach to the side walls regardless of the included angle between the cross member and each side wall for appropriate mounting of the cross member whereby the triangular area bounded by the cross member and the side walls may be chosen to accommodate particular implements.

22 Claims, 4 Drawing Sheets

METHOD OF STORING ELONGATED IMPLEMENTS BETWEEN CORNER SIDE WALLS, A HOLDING MEMBER, AND A FLOOR

REFERENCE TO COPENDING APPLICATION

This is a continuation-in-part of U.S. application Ser. No. 08/670,977, filed 1996 Jun. 26, and abandoned in favor of this application.

BACKGROUND

1. Field of Invention

This invention relates to storage, particularly to a method for storing various elongated implements, such as shovels, rakes and brooms, in a substantially vertical position in a corner defined by two vertical walls and a floor of a room or a building.

2. Prior Art

Various racks have been devised for storing tools and implements in appropriate work places, such as garages and basements. The typical rack includes an elongated wood or plastic plank that is bored or notched to receive and support a plurality of implements. Other racks have been constructed from a perforated wallboard and hooks.

Unfortunately, these arrangements have several shortcomings. The elongated racks, particularly those of the notched configuration, may allow the implements to fall at inopportune moments. Elongated racks also take up important sidewall space in garages that might be needed for cars, and for the passage of persons to and from their cars. Finally, these racks may allow storage of only certain implements having a fixed range of shapes.

SUMMARY

The present invention is a method of storing elongated implements in a room or a building having adjoining sidewalls and a floor forming a corner. The method utilizes a storage system that includes a plate-like elongated cross member having a length several times greater than its width and thickness. It can thereby retain elongated implements, such as garden tools and skis, in a generally vertically upright position bearing on the floor and leaning outwardly front the side walls of the corner toward the cross member. The cross member has a longitudinal axis extending in the direction of its length and generally parallels the floor. Also it has adjustment means for adjusting the length of the cross member to a selected length. The cross member further includes mounting pieces disposed at distal ends of the cross member adapted to secure the cross member to the sidewalls. Preferably, each mounting piece is pivotally secured to the cross member with a hinge. The cross member at the selected length reaches from a first selected location on one of the sidewalls to a second selected location on the other of the sidewalls. In cooperation with the sidewalls it encloses a generally triangular area through which the handles of the tools extend. The mounting pieces are adapted to seat against the respective selected locations on the sidewalls, regardless of the angle between the cross bar member and the sidewalls. The selected locations may be chosen to provide a desired point of attachment for mounting the cross bar member in the corner, whereby the triangular area formed by the cross bar member with the sidewalls may be chosen to accommodate particular tools.

The storage method overcomes the problems associated with prior-art racks. First it adds a degree of versatility over preexisting racks while maintaining simplicity of design and ease of manufacture. Because this method provides a relatively deep triangular area or pocket, it may support implements of different sizes and shapes. In other words, the system provides an elongated system for storing a multiplicity of items. For example, this system can support brooms and skis, whereas previous racks—those that are bored or notched—are not versatile enough to accommodate both.

Also, this method makes use of corner space-space that is otherwise unused and unusable. This corner space is also out of the way of the path of people moving to and from their cars. The design features of the cross member allow secure mounting to the wall studs near the corner, regardless of where the studs may be in relation to the corner.

Finally, this method provides more stable support of the implements: i.e., it captures implements between the floor, sidewalls, and the horizontal cross member. Thus they are unlikely to fall in the event of bumping, shifting high wind, or other conditions which may shift or move the implements.

DRAWINGS

These and other advantages of the present invention will be readily appreciated as the method becomes better understood by reference to the following claims and detailed description of the best mode, when considered in connection with the accompanying drawings.

Figures 1, 2:
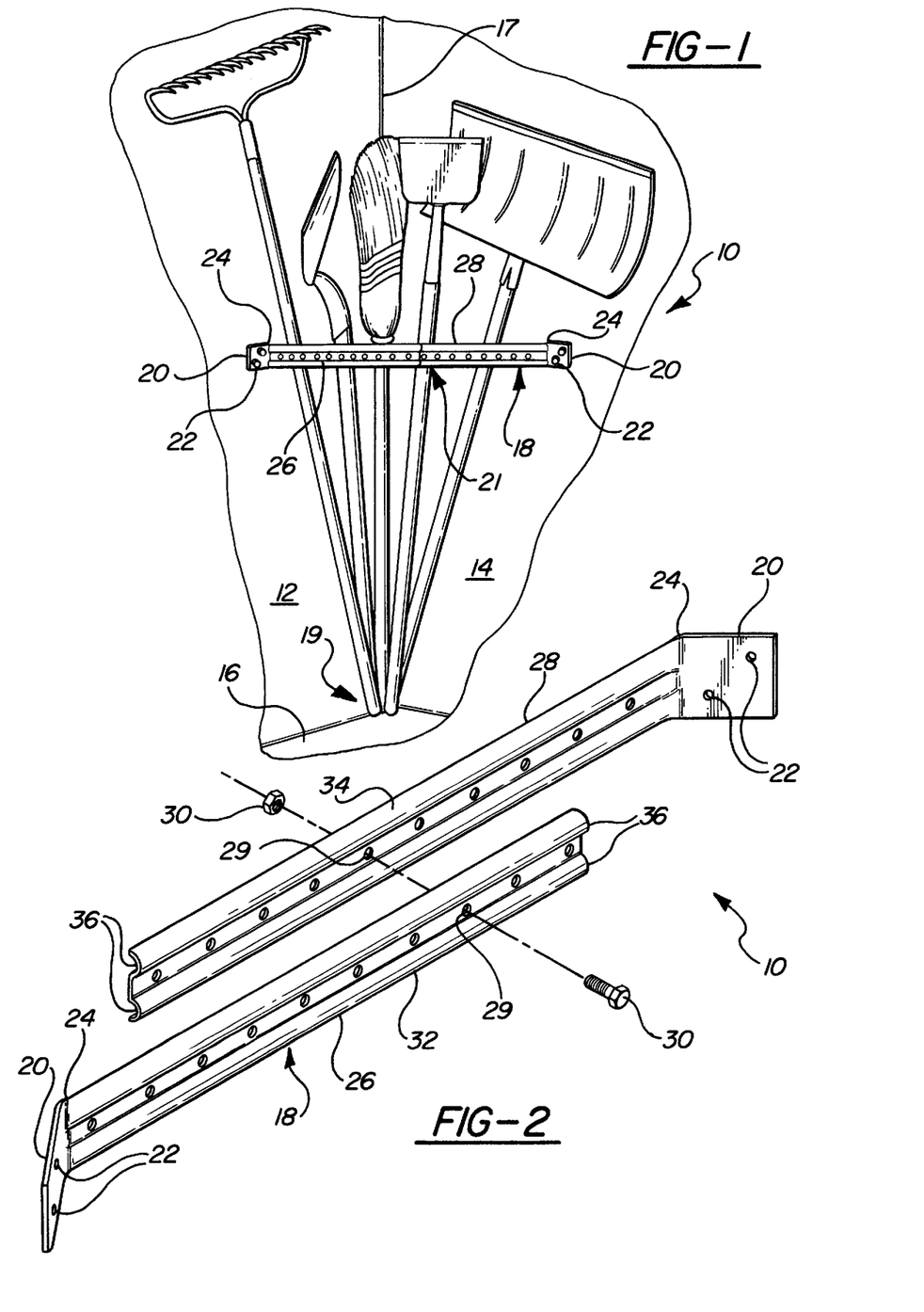
FIG. 1 is a perspective view of a storage system embodying this invention with a cross member mounted between adjoining sidewalls and above a floor of a corner of a structure.
FIG. 2 is an exploded perspective view of the cross member of FIG. 1.

FIGS. 1 and 2—Basic Configuration

FIGS. 1 and 2 illustrate a storage system 10 embodying the method of this invention for use in a building or room having adjoining side walls 12 and 14 disposed and extending generally vertically above a horizontal floor 16 to form a corner 17. Preferably, sidewalls 12 and 14 are disposed at substantially a right angle to each other and to floor 16. Storage system 10 includes a plate-like elongated cross bar or member 18 having a length several times greater than its width and thickness for retaining elongated implements, such as garden tools and skis. According to the invention, implements are inserted in the corner between the walls in a generally vertically position beating at one end on floor 16 and leaning outwardly from the corner toward the cross member. An open pocket or cavity 19 formed by floor 16 and sidewalls 12 and 14 restrains the lower ends of the implements. The upper end of the implements are received and retained between the sidewalls and cross bar 18, which together bound a generally triangular area 21 through which the implements extend.

Cross member 18 is spaced from and extends longitudinally substantially parallel to floor 16 and is attached to sidewalls 12 and 14. Cross bar 18 has a longitudinal axis extending in the direction of its length, and adjustment means for adjusting the length of the cross bar to a selected length. There are many ways of adjusting the length of the cross member, as illustrated in the figures and described below. Cross member 18 is preferably a metal bar or strip, although it can consist of other materials, such as wood, plastic, or even a taut cable.

Cross member 18 further includes mounting plates 20 disposed at its distal ends to secure it to walls 12 and 14. Each plate 20 is typically a flange or strip having one or more holes 22 for receiving a fastener, such as a screw. Each mounting plate 20 is pivotally secured to cross member 18 with a hinge 24.

Hinge 24 can include many embodiments: it can be a piano hinge or a door-style hinge. Perhaps the simplest and therefore most preferred hinge is one formed simply by creating a weakened linear strip or a bend between cross member 18 and mounting piece 20 transverse to the longitudinal axis of the cross member. This enables the mounting piece to pivot with respect to the cross member. This is called a living hinge and is shown at 24 in FIGS. 1, 2, and 7 to 10. In this case, the cross member and mounting plates 20 maybe unitary i.e., one piece, or made from an integral length of metal or plastic 2 which is hinged on either end simply by bending, scoring, or otherwise weakening a portion of the material.

Figure 10:
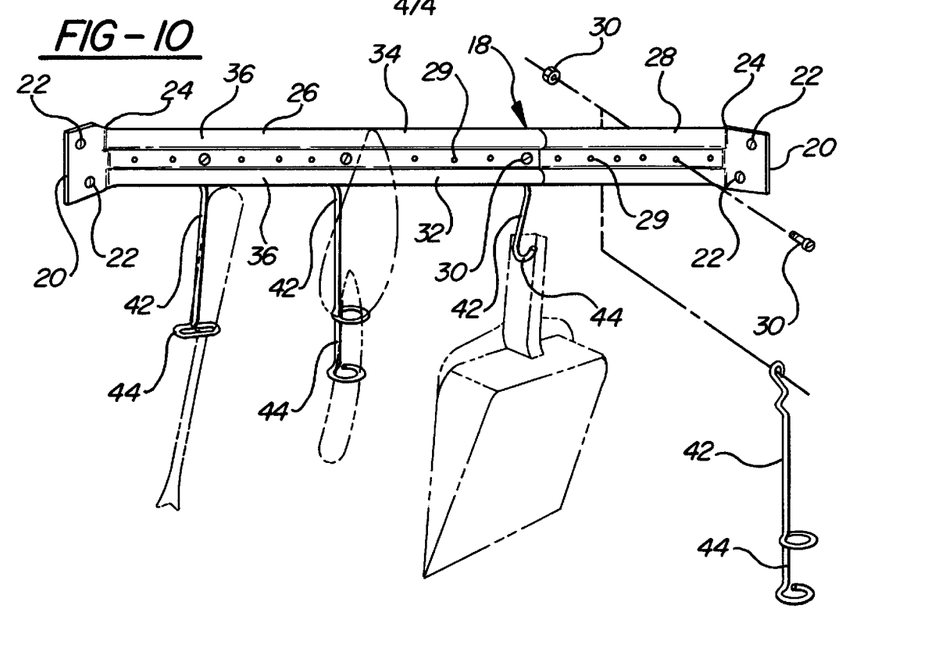
FIG. 10 is a partially exploded perspective view of the cross member of FIGS. 1 and 2 and further depicting several depending carriers for supporting small implements from the cross member.

As shown in FIGS. 1, 2, and 10, preferably cross member 18 includes first and second straps 26 and 28 which are movable axially relative to each other for adjustment of the length of the cross bar. Straps 26 and 28 have slidably mating parts 32 and 34 and at one end terminate in one of ranges 24. Mating parts 32 and 34 are movable axially relative to each other to different positions and have a plurality of holes 29 longitudinally and equally spaced apart along each part. These facilitate securing them together to establish the selected length of cross member 18 by a fastener 30, such as a nut and bolt. This adjustment means provides a cross member that can be installed on sidewalls that are not normal to one another. It also provides secure attachment of the cross member 18 to studs or mortar joints which may be randomly spaced from the corner anywhere from about 15 to 81 cm (6 to 32 in.) and preferably about 15 to 66 cm (6 to 24 in.) from the corner.

First and second straps 26 and 28 may each include at least one axial corrugation 36 extending axially. In the preferred embodiment the first and second straps each include two parallel and transversely spaced corrugations or shallow rounded channels 36 for promoting nesting of parts 26 and 28 during shipping, for enabling strength, ease of alignment of holes 29, and for ease of assembly. Generally, we prefer that straps 26 and 28 be identical for the sake of simplicity and ease of manufacture.

Figure 6:
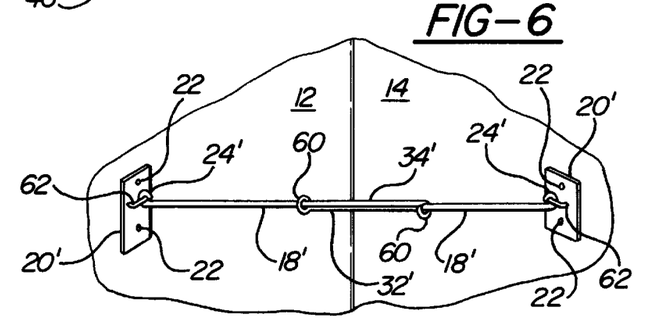
FIG. 6 is a perspective view of another embodiment of a cross member of the storage system of FIGS. 1 and 2.

FIG. 6—Looped Cross Member

FIG. 6 illustrates another form of an adjustable cross member 18' with adjustable metal rods 32' and 34', each, having at one end a loop 60 encircling the other rod. At the other end a hinge loop 24' encircles the bight of a U-shape rod 62 fixed to a mounting plate 20' attached to sidewalls 12 and 14. Loops 60 slide on the rods to permit adjustment of the length of cross member 18' and loops 24' pivot on rods 62 to permit adjustment of the angular orientation of mounting plate 20' relative to the rods.

Figure 7:
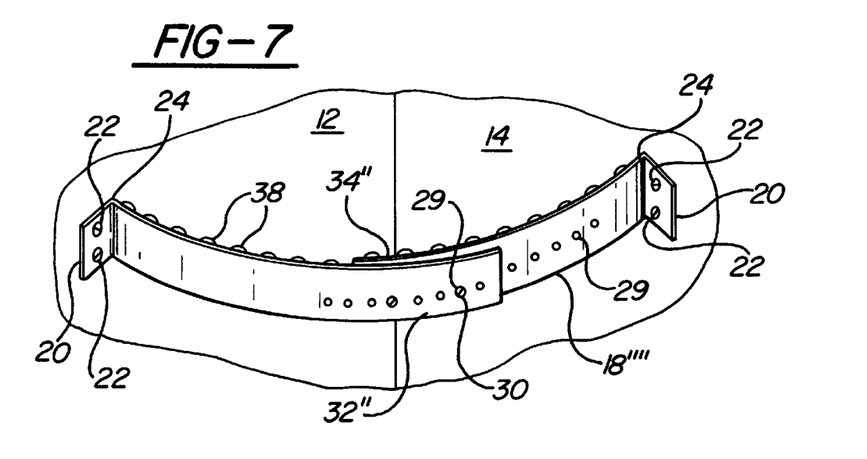
FIG. 7 is a perspective view of a third embodiment of a cross member of the storage system of FIGS. 1 and 2.

FIG. 7—Curved-Strap Cross Member

FIG. 7 illustrates another form of an adjustable cross member 18'''' with arcuate metal straps 32'' and 34'', each with a mounting plate 20 at one end. The cross member may have a plurality of spaced-apart projections 38 along its axis and extending toward walls 12 and 14, whereby the projections inhibit any shifting of the implements stored in the storage rack. Projections 38 may be of any suitable design, including pegs, fingers, corrugations, etc., which are integral with the cross member or affixed to it.

Figure 8:
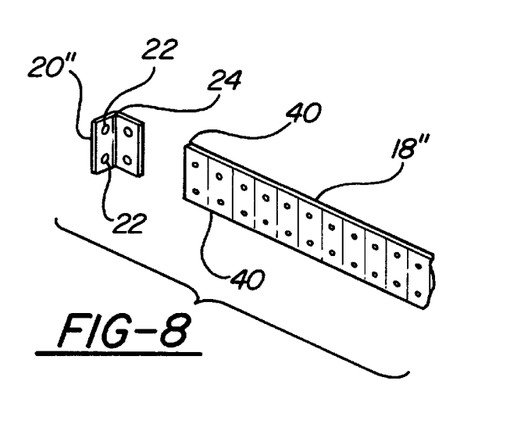
FIG. 8 is a perspective view of a portion of a fourth embodiment of a cross member of the storage system of FIGS. 1 and 2.
Figure 9:
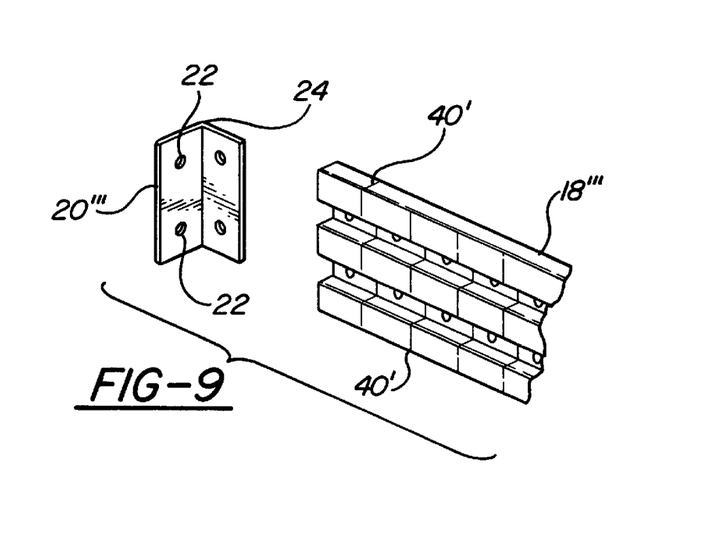
FIG. 9 is a perspective view of a portion of a fifth embodiment of a cross member of the storage system of FIGS. 1 and 2.

FIGS. 8 and 9—Cross Member With Weakened Portions

FIG. 8 illustrates another form of an adjustable cross member 18'''' with a plurality of weakened portions 40 spaced axially along the cross member to allow predetermined lengths of the cross member to be removed to shorten it. In other words, the cross member may be scored or otherwise weakened at intervals to allow a person to break off predetermined lengths of the cross member without the need for tools. As shown in FIG. 8, which depicts the left half of cross member 18'', a segment of this strap may be broken off at any one of weakened portions 40. The broken-off segment may be bent at weakened portion 40 to serve as mounting plate 20' with hinge 24.

FIG. 9 illustrates another form of an adjustable cross member 18''' having a plurality of integral sections formed by longitudinally spaced-apart weakened portions 40', each extending transversely across the strap. Mounting plate 20''' and hinge 24 are separate from the strap of cross member 18''', but may be attached to the strap with fasteners after the length of the strap is adjusted by breaking off a predetermined number of sections at an appropriate weakened portion 40'.

FIG. 10—Holder

As shown in FIG. 10, the storage system may include at least one holder 42 depending from cross member 18. Depending holder 42 includes means 44 for securing a relatively smaller implement to the cross member. Holder 42 is typically formed from metal wire. It is attached to cross member 18 with a common hook or fastener 30. Securing means 44 may be a hook or a loop formed in the holder at the end opposite the end attached to cross member 18 and shaped to support a predetermined type of small implement, such as a trowel, weed digger, or a dust pan.

Figure 11:
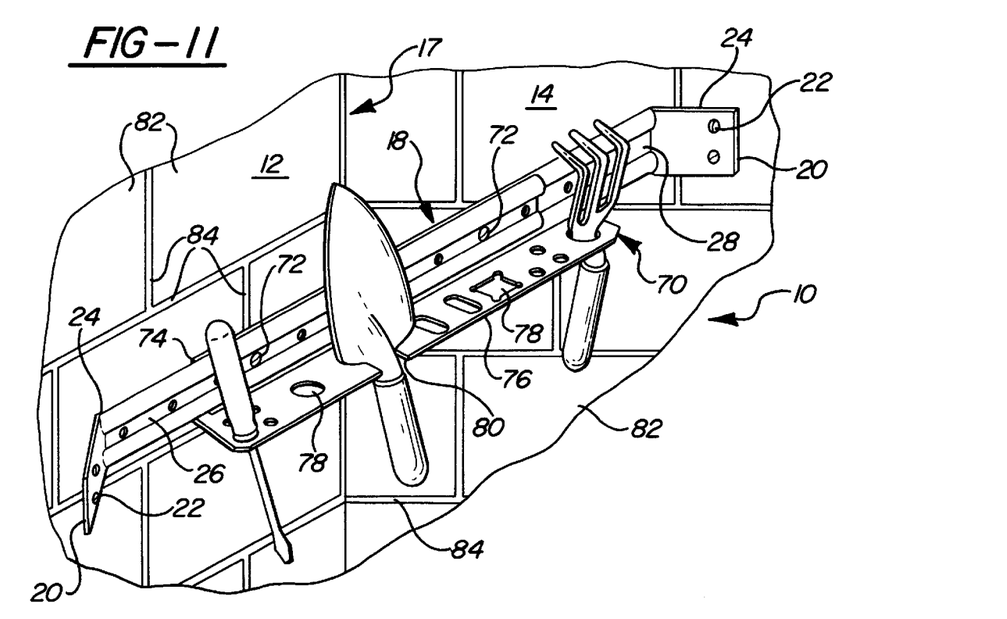
FIG. 11 is a perspective view of a small-implement carrier attached to the cross member of FIGS. 1 and 2.

FIG. 11

As shown in FIG. 11, the small implement holder may also take the form of a bracket 70 made from stamped metal or molded plastic and mounted to the cross member with appropriate fasteners 72. Bracket 70 is L-shaped in cross section and includes a vertical portion 74 adapted to engage cross member 18, and a horizontal portion 76, which can include one or more holes 78 and/or slots 80 for receiving the handle of a small implement or tool. The cross member may be mounted on walls 12 and 14 of brick or blocks 82 with fasteners.

Figure 3:
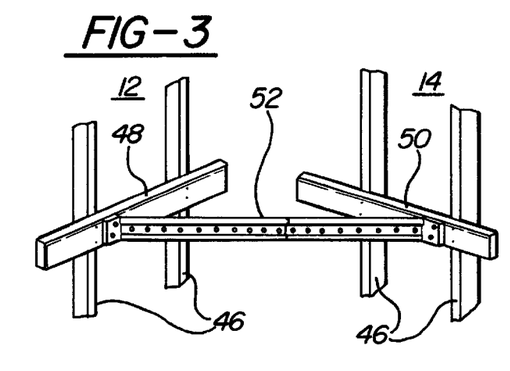
FIG. 3 is a perspective view of a cross member supported on first and second stud-bridging support members.
Figure 4:
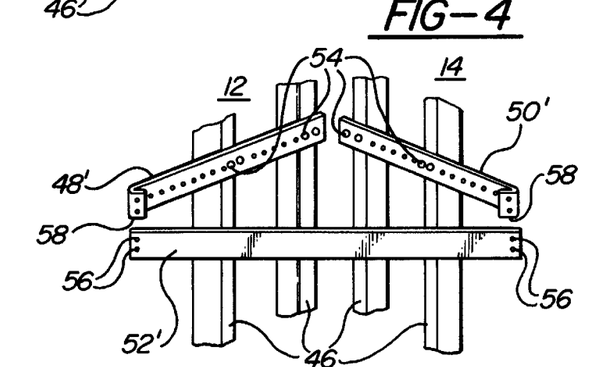
FIG. 4 is a second embodiment of the cross member and supports of FIG. 3.
Figure 5:
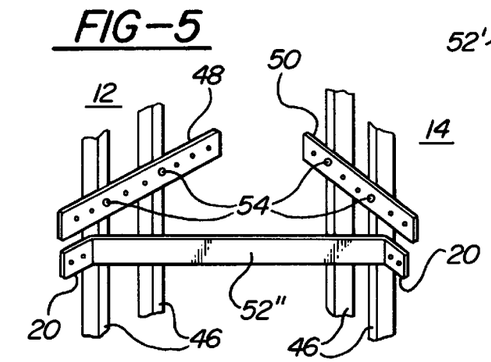
FIG. 5 is a third embodiment of the cross member and supports of FIG. 3.

FIGS. 3–5

As shown in FIGS. 3–5, in some cases it is desirable to have a storage system in which the cross member can be secured directly to studs 46 or mortar joints in walls 12 and 14. This can be done even if the studs or mortar joints are not located in convenient locations. The storage system has a first elongated support member 48 adapted to be mounted horizontally on wall 12, and a second elongated member 50 adapted to be mounted horizontally on wall 14. Support members 48 and 50 each have a predetermined length selected to bridge at least two of studs 46 or mortar joints so that each support member may be supported on and secured to at least two adjacent studs or mortar joints. This typically translates into a length of 41 to 61 cm (16 to 24 in.), depending upon the stud or mortar joint separation width or spacing. A platelike elongated cross member 52 has a length several times greater than its width and thickness for retaining elongated implements, which are inserted as before, in a generally vertically upright position leaning outwardly from the bottom of the corner toward the cross member. Cross member 52 has a length which extends from a first selected location on the first support member to a second selected location on the second support member. The cross member bridges the selected locations, whereby the triangular shape formed by the walls 12 and 14, support members 48 and 50, and cross member 52 may be selected to accommodate specific implements As shown in FIG. 5, support members 48 and 50 may include a plurality of holes 54 spaced axially along its length to provide a plurality of selective attachment points for attaching each support member to the associated stud.

As one of skill can appreciate, there are various ways of attaching cross member 52 to support members 48 and 50. A few such ways are shown in FIGS. 3–5. Cross member 52 may closely resemble cross member 18 of FIGS. 1 and 2, or it may be a simpler form, as shown in FIGS. 4 and 5. As shown in FIG. 4, cross member 52' may be a one-piece strap of metal with holes 56 adjacent its ends for attaching it to hinge plates 58 on one end of each support member 48' and 50'. As shown in FIG. 5, cross member 52" may be a one-piece metal strap with mounting plates 20 at both ends having mounting holes for attaching the cross member to support members 48 and 50 with fasteners, such as bolts and nuts.

In the storage systems, the cross member has a length selected to reach from a first selected location on wall 12 to a second selected location on wall 14 with tie cross member bridging the selected locations. The mounting plates are adapted to seat against the respective locations on the walls regardless of the angle between the cross member and the walls, and regardless of the location of studs 46 or mortar joints relative to the corner. The selected locations may be chosen to provide a desired point of attachment for mounting the cross member in the corner. The particular triangular shape or perimeter formed by the cross member with the sidewalls may be chosen to accommodate particular tools or other implements, such as garden shovels, snow shovels, rakes, skis, golf clubs, tubing, etc.

The handles or ends of the implements to be stored actually seat in pocket 19 formed by sidewalls 12 and 14 and floor 16. This retains the implements in a generally vertically upright position, is handy, and takes a minimum of floor space leaving room for storage of other items, or for persons to pass by safely.

The method according to the invention thus can be used to store at least one elongated implement in a convenient, economical, easy, and rapid manner. It is performed by first providing an elongated holding member having a pair of opposite ends with a wall attachment at each end. The wall attachments are arranged to attach the opposite ends to a pair of respective vertical walls that are oriented at an angle to each other. The elongated holding member will then be generally horizontally oriented. The walls extend up from a horizontal surface (the floor) and form an inside vertical corner junction that extends up from the floor. The pair of wall attachments are attached to the walls at a predetermined distance up from the floor such that the elongated holding member will form a generally triangular holding space having a border formed by it and adjacent portions of the walls. At least one elongated implement having a pair of opposite ends is inserted in the holding space, such that one end at the bottom of the implement rests upon the floor and the opposite end at the top of the implement extends up above the elongated holding member. A portion of the elongated implement closer to its top than to its bottom rests against a portion of the border formed by the elongated holding member and the adjacent portions the vertical walls. In this manner the elongated implement can be accessibly stored and retrieved.

SCOPE AND RAMIFICATIONS

While the invention has been described in an illustrative manner, it should be understood that the terminology used is intended to be in the nature of words of description, rather than of limitation.

Obviously, many modifications and variations of the present method are possible in light of the above teachings. Therefore, within the scope of the appended claims the invention may be practiced otherwise than as specifically described. Moreover, the reference numerals are merely for convenience and are not intended to be in any way limiting. Therefore the scope of the invention should be determined by the appended claims and their legal equivalents.

What is claimed is:

1. A method of storing at least one elongated implement in a generally vertical orientation, comprising the steps of:

providing an elongated holding member having a part of opposite ends with a wall attachment at each opposite end, attaching said wall attachments to a pair of vertical walls of a building, said vertical walls being oriented at an angle with respect to each other, extending up from a horizontal surface, and forming an inside vertical corner junction extending up from said horizontal surface, said wall attachments being attached to said vertical walls at a predetermined distance from said horizontal surface such that said elongated holding member is generally horizontally oriented and such that said elongated holding member forms a generally triangular holding space having a border defined by said elongated holding member and adjacent portions of said vertical walls, inserting said at least one elongated implement having a pair of opposite ends in said holding space, such that one of said ends of said elongated implement rests upon said horizontal surface and the other of said ends of said elongated implement extends above said elongated holding member, and such that a portion of said elongated implement closer to said other of said ends of said elongated implement than to said one of said ends of said elongated implement rests against a portion of said elongated holding member.

2. The method of claim 1 wherein said elongated holding member comprises first and second elongated parts which are joined together and which are movable with respect to each other for adjusting the length of said elongated holding member.

3. The method of claim 2, further including providing a fastener that joins said first and second elongated parts together.

4. The method of claim 2, further including providing each of said first and second elongated parts with at least one corrugation extending along the length thereof so that said corrugations complimentary mate with each other to align said first and second elongated parts in an elongated overlapping relationship.

5. The method of claim 1, further including providing said elongated holding member with a plurality of projections spaced apart from one another along said elongated holding member and extending toward said vertical cornerjunction, so that said projections inhibit said elongated implement from shifting in said holding space.

6. The method of claim 1 wherein said elongated holding member comprises a plurality of segments so that the length of said elongated holding member can be shortened by removing some of said segments therefrom.

7. The method of claim 1, further including providing said elongated holding member with at least one depending holder extending from said holding member.

8. The method of claim 1, further including providing said elongated holding member with a bracket attached to said elongated holding member, said bracket having a plurality of openings therethrough.

9. The method of claim 1 wherein said vertical walls each have at least one stud therein and said wall attachments are attached to said studs.

10. The method of claim 9 wherein each of said studs comprises has a pair of studs, and further including providing a pair of stud-bridging support members and attaching each stud-bridging support member to the pair of studs in a respective one of said vertical walls, so that each stud-bridging support member is parallel to said respective one of said walls and is attached to the of studs therein, and wherein said pair wall attachments at said opposite ends of said elongated holding member are attached to said stud-bridging support members.

11. A method of storing at least one elongated implement, comprising the steps of:
providing a room having at least two vertical walls that are oriented at an angle with respect to each other and that form an inside vertical corner junction extending up from a horizontal floor of said room,
providing an elongated holding member having a pair of opposite ends with a wall attachment means at each opposite end,
attaching each wall attachment means to a respective one of said vertical walls at a predetermined distance from said horizontal floor such that said elongated holding member is generally horizontally oriented and such that said elongated holding member forms a generally triangular holding space having a border defined by said elongated holding member and adjacent portions of said vertical walls,
inserting said at least one elongated implement having a part of opposite ends in said holding space, such that one of said ends of said elongated implement rests upon said horizontal floor and the other of said ends of said elongated implement extends up above said elongated holding member, and such that a portion of said elongated implement, closer to said other of said ends of said implement than to said one of said ends of said elongated implement, rests against a portion of said elongated holding member.

12. The method of claim 11 wherein said elongated holding member comprises first and second elongated parts which are joined together and which are movable with respect to each other for adjusting the length of said elongated holding member.

13. The method of claim 12, further including providing said elongated holding member with a plurality of projections spaced apart from one another along said elongated holding member and extending toward said vertical corner junction, so that said projections inhibit said elongated implement from shifting in said holding space.

14. The method of claim 12, further including providing a fastener which joins said first and second elongated parts together.

15. The method of claim 12, further including providing each of said first and second elongated parts with at least one corrugation extending along the length thereof so that said corrugations complimentary mate with each other to align said first and second elongated parts in an overlapping relationship.

16. The method of claim 11 wherein said elongated holding member comprises a plurality of segments so that the length of said elongated holding member can be shortened by removing said segments therefrom.

17. The method of claim 11, further including providing said elongated holding member with at least one depending holder extending from said elongated holding member.

18. The method of claim 11, further including providing said elongated holding member with a bracket attached to said elongated holding member, said bracket having a plurality of openings therethrough.

19. The method of claim 11 wherein said vertical walls each have at least one stud therein and said wall attachments means are attached to said studs.

20. The method of claim 11 wherein said at least one elongated implement comprises a plurality of elongated implements inserted in said holding space.

21. A method of storing at least one elongated implement in a generally vertical orientation, comprising the steps of:
providing an elongated holding member having a pair of opposite ends with a wall attachment at each opposite end,
attaching said wall attachments to a pair of studs, each said stand disposed in a vertical wall, said walls being oriented at an angle with respect to each other, said walls extending up from a horizontal surface and forming an inside vertical corner junction extending up from said horizontal surface, said wall attachments being attached to said studs at a predetermined distance from said horizontal surface and such that said elongated holding member is generally horizontally oriented and such that said elongated holding member forms a generally triangular holding space having a border defined by said elongated holding member and adjacent portions of said vertical walls,
inserting said at least one elongated implement having a pair of opposite ends in said holding space, such that one of said ends of said elongated implement rests upon said horizontal surface and the other of said ends of said elongated implement extends up above said elongated holding member, and such that a portion of said elongated implement, closer to said other of said ends of said elongated implement them to said one of said ends of said elongated implement, rests against a portion of said elongated holding member.

22. The method of claim 2 wherein said stud in one of said vertical walls comprises a pair of spaced studs, and further including attaching a stud-bridging support member to said pair of studs of said one of said vertical walls so that said stud-bridging support member is parallel to said one of said vertical walls and is attached to the pair of studs therein, and wherein one of said wall attachments is attached to said stud-bridging support member.

* * * * *

UNITED STATES PATENT AND TRADEMARK OFFICE
CERTIFICATE OF CORRECTION

PATENT NO..: 6,142,320
DATED: Nov. 7, 2000
PATENTEES: DeLorean, J. Z. and P. J It is certified that error appears in the above-identified patent and that said Letters Patent is hereby corrected as shown below:

Abstract page, Item [63], change "Jun. 26, 1999" to — Jun. 26, 1996—.

Claim 1, line 3, change "part" to —pair—.

Col. 8, last line, change "them" to —than—.

Signed and Sealed this

Eighth Day of May, 2001

NICHOLAS P. GODICI

*Attest:*

*Attesting Officer*   Acting Director of the United States Patent and Trademark Office